(12) United States Patent
Schmid et al.

(10) Patent No.: US 8,185,272 B2
(45) Date of Patent: May 22, 2012

(54) METHOD AND DEVICE FOR ACTIVATING A PERSONAL PROTECTION ARRANGEMENT IN THE EVENT OF A ROLLOVER

(75) Inventors: Michael Schmid, Kornwestheim (DE); Marc Andre Tichy, Tuebingen (DE); Holger Denz, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 777 days.

(21) Appl. No.: 12/084,949

(22) PCT Filed: Sep. 27, 2006

(86) PCT No.: PCT/EP2006/066800
§ 371 (c)(1),
(2), (4) Date: Jan. 12, 2009

(87) PCT Pub. No.: WO2007/054402
PCT Pub. Date: May 18, 2007

(65) Prior Publication Data
US 2009/0171535 A1 Jul. 2, 2009

(30) Foreign Application Priority Data

Nov. 14, 2005 (DE) .......................... 10 2005 054 127

(51) Int. Cl.
*B60R 21/0132* (2006.01)
(52) U.S. Cl. ........... 701/45; 180/282; 280/734; 280/735
(58) Field of Classification Search .................. 180/282; 280/734, 735; 701/45
See application file for complete search history.

(56) References Cited

U.S. PATENT DOCUMENTS

| 5,890,084 | A | | 3/1999 | Halasz et al. |
| 6,038,495 | A | * | 3/2000 | Schiffmann ........................ 701/1 |
| 6,161,905 | A | * | 12/2000 | Hac et al. ....................... 303/146 |
| 6,192,305 | B1 | | 2/2001 | Schiffmann |
| 6,494,281 | B1 | * | 12/2002 | Faye et al. ...................... 180/197 |
| 6,496,759 | B1 | * | 12/2002 | Mattes et al. ..................... 701/1 |
| 6,542,073 | B2 | * | 4/2003 | Yeh et al. ....................... 340/440 |
| 6,631,317 | B2 | * | 10/2003 | Lu et al. .......................... 701/45 |
| 6,701,276 | B2 | * | 3/2004 | Kueblbeck et al. ........... 702/145 |
| 6,843,538 | B1 | | 1/2005 | Nagae et al. |
| 6,954,691 | B2 | * | 10/2005 | Roll et al. ....................... 701/70 |
| 6,963,797 | B2 | * | 11/2005 | Salib et al. ..................... 701/45 |
| 7,020,552 | B2 | * | 3/2006 | Park .............................. 701/45 |
| 7,664,587 | B2 | * | 2/2010 | Kroeninger et al. ............. 701/70 |
| 7,740,098 | B2 | * | 6/2010 | Lich et al. ..................... 180/282 |
| 7,774,103 | B2 | * | 8/2010 | Deng et al. ....................... 701/1 |
| 7,848,864 | B2 | * | 12/2010 | Huang .............................. 701/37 |
| 2002/0165654 | A1 | * | 11/2002 | Weaver et al. .................. 701/45 |
| 2003/0065430 | A1 | | 4/2003 | Lu et al. |
| 2003/0130775 | A1 | * | 7/2003 | Lu et al. .......................... 701/36 |
| 2003/0182041 | A1 | * | 9/2003 | Watson ........................... 701/45 |

(Continued)

FOREIGN PATENT DOCUMENTS

CN 1605505 3/2005

(Continued)

*Primary Examiner* — Ruth Ilan
*Assistant Examiner* — James English
(74) *Attorney, Agent, or Firm* — Kenyon & Kenyon LLP

(57) ABSTRACT

A method and a device for activating a personal protection arrangement in the event of a rollover are provided, according to which, initially, at least one first driving dynamic variable is ascertained and then, based on this first driving dynamic variable, a second driving dynamic variable is determined, in order to activate the personal protection arrangement as a function of these two driving dynamic variables.

10 Claims, 2 Drawing Sheets

U.S. PATENT DOCUMENTS

| | | |
|---|---|---|
| 2004/0128060 A1 | 7/2004 | Park |
| 2005/0060082 A1* | 3/2005 | Heuer et al. ................... 701/70 |
| 2005/0080544 A1* | 4/2005 | Suzuki et al. .................. 701/70 |
| 2005/0149240 A1* | 7/2005 | Tseng et al. ................... 701/38 |
| 2006/0158031 A1* | 7/2006 | Kummel et al. ............. 303/146 |
| 2007/0055431 A1* | 3/2007 | Deng et al. .................... 701/71 |
| 2007/0182138 A1* | 8/2007 | Lich et al. ................... 280/735 |
| 2008/0281482 A1* | 11/2008 | Huang ........................... 701/29 |
| 2009/0099735 A1* | 4/2009 | McCoy et al. .................. 701/46 |
| 2009/0216409 A1* | 8/2009 | Lich et al. ...................... 701/46 |
| 2011/0082614 A1* | 4/2011 | Tichy et al. .................... 701/29 |

FOREIGN PATENT DOCUMENTS

| | | |
|---|---|---|
| DE | 103 03 149 | 7/2004 |
| JP | 11-64008 | 3/1999 |
| WO | WO 2004/020253 | 3/2004 |

\* cited by examiner

US 8,185,272 B2

METHOD AND DEVICE FOR ACTIVATING A PERSONAL PROTECTION ARRANGEMENT IN THE EVENT OF A ROLLOVER

FIELD OF THE INVENTION

The present invention relates to a method and a device for activating a personal protection arrangement in the event of a rollover.

BACKGROUND INFORMATION

German patent document DE 10303149 A1 discusses making an activation decision as a function of various driving-dynamic variables, such as the lateral vehicle acceleration, a rate of rotation, and the speed of the vehicle's center of gravity. From the related art cited therein, it is also known to consider the sideslip angle when deciding whether to activate a personal protection arrangement in the event of a rollover.

SUMMARY OF THE INVENTION

In contrast, the device and the method for activating a personal protection arrangement in the event of a rollover have the advantage that a time advantage is gained, given that the proactive estimate of driving-dynamic variables is used, thereby also resulting in improved activation performance of the rollover detection algorithm. These driving-dynamic variables are proactively estimated immediately before the rollover occurs, and may therefore be considered in the activation decision at an early point in time. The proactive estimate is based on currently ascertained driving-dynamic variables. The currently ascertained driving-dynamic variables and the pre-estimated variables need not be the same. That is, the lateral vehicle speed, for example, may be estimated based on the lateral vehicle acceleration, yaw rate, and sideslip angle. The proactive estimate is carried out as a module, which may be in a microcontroller as the evaluation circuit.

The measures and refinements listed in the dependent claims allow for advantageous improvements of the device and the method described in the independent claims for activating a personal protection arrangement in the event of a rollover.

It is advantageous, in particular, that the lateral vehicle speed and sideslip angle are pre-estimated based on the yaw rate and sideslip angle. These two variables—the lateral vehicle speed and the sideslip angle—have proven especially advantageous for forming the activation decision for the personal protection arrangement.

A first time constant may also be used advantageously in the pre-estimate. This time constant takes into account the effect of the yaw motion on the future development of the sideslip angle.

It is advantageous according to the exemplary embodiments and/or exemplary methods of the present invention that the sensor system is also configured to register the lateral vehicle acceleration. This then makes it possible to pre-estimate the lateral vehicle speed also as a function of the lateral vehicle acceleration. This improves the estimate, since, in particular, an over-estimation of the lateral vehicle speed is thereby prevented. Alternatively, it is also possible to use a constant acceleration. In this case, a further time constant that indicates the duration of action of the lateral acceleration is also used. As an alternative to the measured lateral vehicle acceleration, a constant, settable value, a value range, or a specified function may be used, all of which are implied in the term specified value.

Exemplary embodiments of the present invention are presented in the drawing and are described in greater detail in the description below.

DETAILED DESCRIPTION

Figure 1:
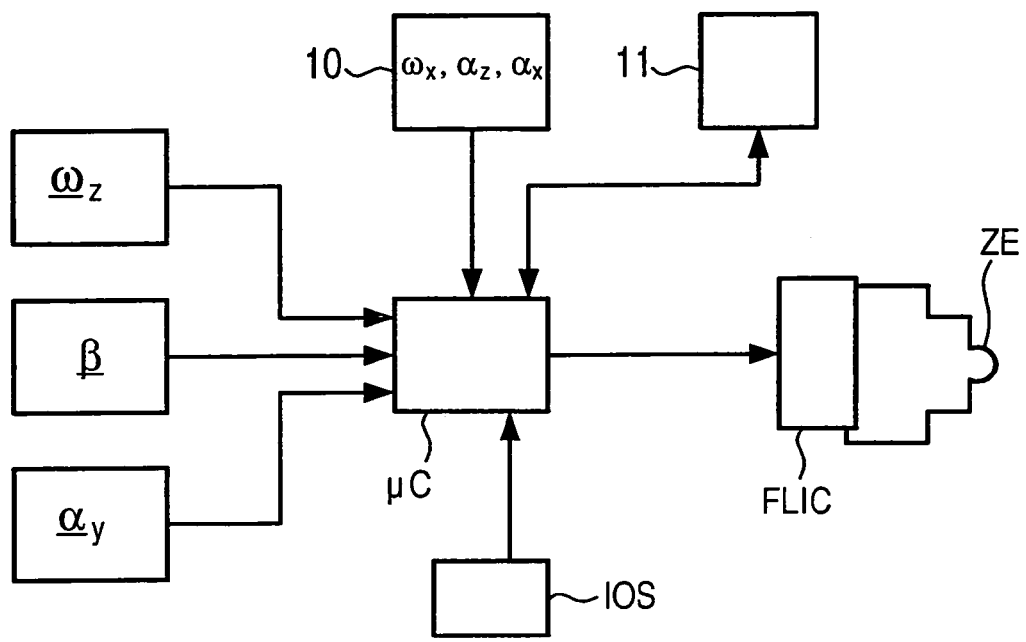
FIG. 1 shows a block diagram of the device of the present invention.

Numbers obtained in the U.S.A. reinforce the significance of passive safety in the event of vehicle turnovers or rollover events:

In 1998, half of all fatal single-vehicle accidents were due to rollovers. Rollovers are involved in about 20% of all accidents. According to the exemplary embodiments and/or exemplary methods of the present invention, it is provided that driving dynamic variables are pre-estimated, in order to gain a time advantage in dangerous accidents such as rollovers. The pre-estimate is carried out based on measured driving dynamic variables. It has proven advantageous, in particular, to use the sideslip angle and the lateral vehicle speed $v_y$ as variables to be pre-estimated. Sideslip angle $\beta_{estim}$ may be pre-estimated based on current sideslip angle $\beta_{current}$, current yaw rate $\omega_{z,current}$ of the vehicle, and a settable time constant $$t_{estim}: \beta_{estim} = \beta_{current} + \omega_{z,current} \cdot t_{estim} \quad (1)$$

Time constant $t_{estim}$ takes into account the effect of yaw motion on the future development of the sideslip angle.

The current lateral speed $v_{y,current}$ is determined based on the speed of center of gravity $v_{CM,current}$ of the vehicle, as follows:

$$v_{y,current} = v_{CM,current} \cdot \sin \beta_{current} \quad (2)$$

The speed of the center of gravity must be provided from an external source for this method. Ideally, the speed information, e.g., from the ESP control unit, is available for this purpose. As an alternative, the speed of the center of gravity may be calculated using measured variables, e.g., the wheel speed, GPS data, or an optical sensor system.

It would then be a simple matter to pre-estimate $v_{y,\,estim}$ by inserting the pre-estimate for $\beta_{estim}$ from equation (1) into equation (2):

$$v_{y,\,estim} = v_{CM,current} \cdot \sin \beta_{estim} = v_{CM,current} \cdot \sin (\beta_{current} + \omega_{z,current} \cdot t_{estim}) \quad (3)$$

The disadvantage of equation (3) is that it may result in an over-estimation of the sideslip angle, depending on which parameters were selected and the future lateral speed would be assumed to be too high as a result. To advantageously counteract this effect, the current lateral acceleration of the motor vehicle—which is measured using sensors in the air bag control unit, for example—or a constant acceleration may be used, the braking influence of which on the lateral motion during a skidding or rollover event of the motor vehicle results in a future reduction in the lateral speed or lateral vehicle speed. Equation (3) must be supplemented accordingly by an $a_{y,current}$ term for the current acceleration and also by a second time constant $t_{estim2}$, which indicates the duration of action of the lateral acceleration:

$$v_{y,\,estim} = v_{CM,current} \cdot \sin (\beta_{current} + \omega_{z,current} \cdot t_{estim}) - a_{y,current} \cdot t_{estim2} \quad (4)$$

Instead of the currently measured lateral acceleration $a_y$, it is also possible to use a constant, settable value, a value range, or a specified function. This depends on the implementation and application of the provided functionality.

FIG. 1 shows the inventive device in a block diagram. A yaw rate sensor system $\omega_z$, a sideslip angle sensor system $\beta$, a sensor system for sensing lateral vehicle acceleration $a_y$, an occupant sensor system IOS, and a remaining sensor system 10 are each connected via data inputs to a microcontroller $\mu C$ as the evaluation circuit, which is connected to a memory 11 via a data input/output. Microcontroller $\mu C$ is connected to an ignition circuit control FLIC via an output, to which an ignition element ZE is connected. The sensors may be located inside or outside of the control unit in which microcontroller $\mu C$ and ignition circuit control FLIC are located. Other components, which are not essential to the understanding of the exemplary embodiments and/or exemplary methods of the present invention but which belong to an air bag control unit, are not shown, for the sake of simplicity. The sensors may be located, for example, in a sensor box as peripheral sensors, or in an electronic control unit for a vehicle dynamics control system.

Based on the sensor values from sensors 10, IOS, $\omega_z$, $\beta$ and $a_y$, microcontroller $\mu C$ makes the decision to activate ignition element ZE. To this end, microcontroller $\mu C$ uses an algorithm stored in memory 11, and a few pre-set values. A rate of rotation sensor configured accordingly may be used as yaw rate sensor $\omega_z$. It is also possible to derive the yaw rate from an acceleration sensor system. Sideslip angle sensor $\beta$ or sideslip angle-sensitive sensor $\beta$ is either a sensor that is able to register the sideslip angle directly—for which optical sensors are suited, for example—or it is derived from the sensor signals from acceleration sensors or other sensors. Lateral vehicle acceleration $a_y$ is finally determined by an appropriately configured acceleration sensor system. The sensor values of remaining sensors 10, $\omega_x$, $a_z$ and $a_x$ are also ascertained by acceleration sensors and/or rate of rotation sensors. Occupant classification sensors IOS may be force measuring bolts, for example, which are integrated into the vehicle seat. Alternatively, video sensors, seat mats or other similar techniques are also applicable, however. Memory 11 is a writable or also a non-writable memory. In the event of activation, ignition element ZE is energized by an ignition circuit control unit FLIC.

Figure 2:
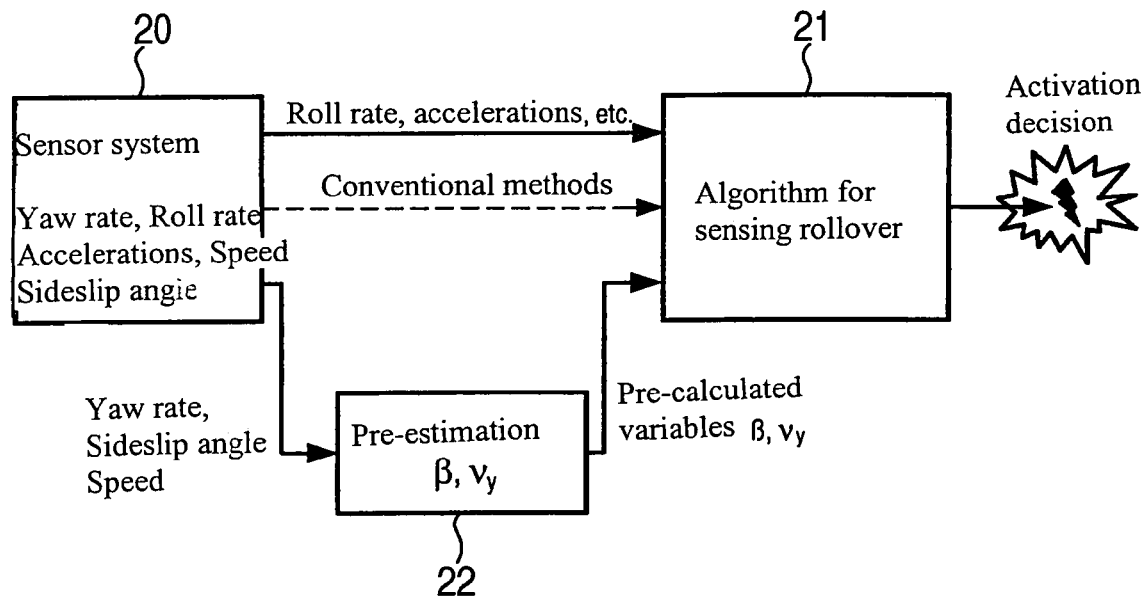
FIG. 2 shows a further block diagram of the sequence of steps in the method of the present invention.

The inventive procedure carried out by the device depicted in FIG. 1 is explained with reference to FIG. 2. Using a sensor system 20, sensor values such as yaw rate, roll rate, acceleration, speed, and sideslip angle are registered, the roll rate and acceleration, etc., being incorporated directly into algorithm 21 for sensing a rollover. However, a module 22 for pre-estimating sideslip angle $\beta$ and lateral vehicle speed $v_y$ is provided between sensor system 20 and algorithm 21, which runs on microcontroller $\mu C$. Yaw rate $\omega_z$, sideslip angle $\beta$, and speed $v_{CM}$ are therefore input into this module 22 as input values. From this, as explained above, sideslip angle $\beta$ and lateral vehicle speed $v_y$ are then pre-estimated, and these values are supplied to algorithm 21, so that the latter may take these pre-estimated values into account to make the activation decision.

Figure 3:
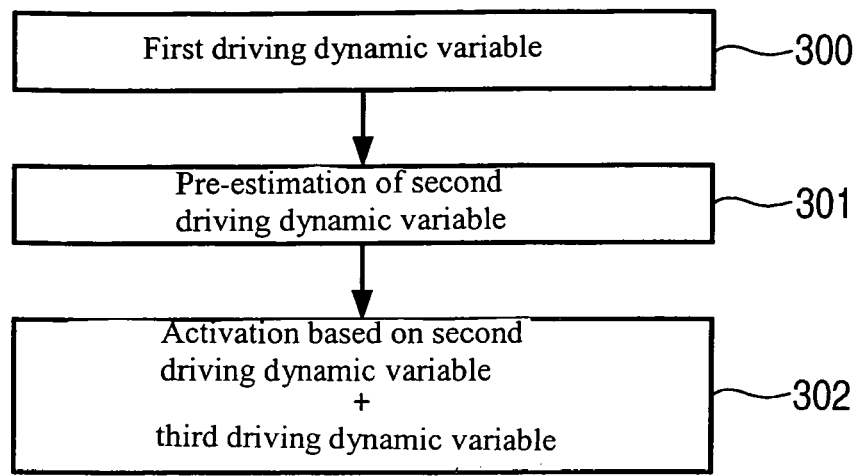
FIG. 3 shows a first flow chart of the method.

The sequence of the inventive method is explained in a flow chart shown in FIG. 3. In method step 300, the first driving dynamic variables, which are described in the independent claims, are ascertained. As shown in FIG. 1, these are, for example, yaw rate $\omega_z$, sideslip angle $\beta$, the speed, and lateral vehicle acceleration $a_y$. In method step 301, the equations described above are used to pre-estimate the second driving dynamic variables, i.e., sideslip angle $\beta$ and lateral vehicle speed $v_y$. Methods other than the equations described above are also possible, for example, approximation methods. In method step 302, microcontroller $\mu C$ finally determines the activation based on the second driving dynamic variables and further, third driving dynamic variables, which are incorporated in algorithm 21 directly from the sensor system. They include, for example, roll rate $\omega_x$ and other acceleration values.

Figure 4:
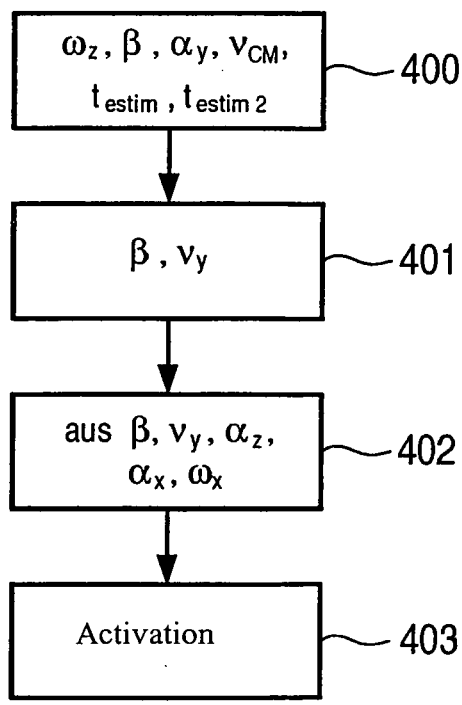
FIG. 4 shows a second flow chart of the method.

The sequence of the inventive method is explained in a further flow chart shown in FIG. 4. In method step 400, sensor system 20 determines yaw rate $\omega_z$, sideslip angle $\beta$, lateral vehicle acceleration $a_y$, speed of the center of gravity $v_{CM}$, and times $t_{estim}$ and $t_{estim2}$, or these are downloaded from memory 11. On this basis, sideslip angle $\beta$ and lateral vehicle speed $v_y$ are then pre-estimated in method step 401.

In method step 402, the determination is made as a function of sideslip angle $\beta$, lateral speed of the vehicle $v_y$, vertical acceleration $a_z$, longitudinal acceleration of the vehicle $a_x$, and roll rate $\omega_x$ as to whether to activate the personal protection arrangement. The activation is then carried out in method step 403.

What is claimed is:

1. A device for activating a personal protection arrangement in the event of a rollover, comprising:
a sensor system to output at least one first driving dynamic variable;
an evaluation circuit to pre-estimate at least one second driving dynamic variable as a function of the at least one first driving dynamic variable, and to activate the personal protection arrangement as a function of the second driving dynamic variable,
wherein the sensor system is configured to output a yaw rate and a first sideslip angle as the at least one first driving dynamic variable, and wherein the evaluation circuit pre-estimates a lateral vehicle speed and a second sideslip angle as the at least one second driving dynamic variable as a function of the yaw rate and the first sideslip angle.

2. The device of claim 1, wherein the evaluation circuit is connected to a memory, from which the evaluation circuit loads a first time constant, which it uses to pre-estimate the lateral vehicle speed and the second sideslip angle.

3. The device of claim 2, wherein the sensor system is configured to register a lateral vehicle acceleration, and wherein the evaluation circuit takes the lateral vehicle acceleration into account to pre-estimate the lateral vehicle speed.

4. The device of claim 3, wherein the evaluation circuit loads a second time constant from the memory to pre-estimate the lateral vehicle speed.

5. The device of claim 2, wherein the evaluation circuit loads at least one specified value from the memory for the lateral vehicle acceleration.

6. A method for activating a personal protection arrangement in the event of a rollover, the method comprising:
ascertaining at least one driving dynamic variable;
pre-estimating at least one second driving dynamic variable as a function of the at least one first driving dynamic variable; and activating the personal protection arrangement as a function of the second driving dynamic variable,
wherein the yaw rate and a first sideslip angle are ascertained as the first driving dynamic variables, and based on the yaw rate and the first sideslip angle, a lateral vehicle speed and a second sideslip angle are pre-estimated as the second driving dynamic variables.

7. The method of claim 6, wherein a first time constant is additionally used to pre-estimate the lateral vehicle speed and the second sideslip angle.

8. The method of claim 7, wherein the lateral vehicle acceleration is used to pre-estimate the lateral vehicle speed.

9. The method of claim 8, wherein a second time constant is used to pre-estimate the lateral vehicle speed.

10. The method of claim 7, wherein, at least one specifiable value is used instead of the lateral vehicle acceleration.

* * * * *